US 6,978,039 B2

(12) United States Patent
Cline et al.

(10) Patent No.: US 6,978,039 B2
(45) Date of Patent: Dec. 20, 2005

(54) METHOD AND SYSTEM FOR SEGMENTATION OF MEDICAL IMAGES

(75) Inventors: Harvey Ellis Cline, Niskayuna, NY (US); Siegwalt Ludke, Scotia, NY (US)

(73) Assignee: General Electric Company, Niskayuna, NY (US)

(*) Notice: Subject to any disclaimer, the term of this patent is extended or adjusted under 35 U.S.C. 154(b) by 612 days.

(21) Appl. No.: 09/683,321

(22) Filed: Dec. 13, 2001

(65) Prior Publication Data

US 2003/0113003 A1   Jun. 19, 2003

(51) Int. Cl.$^7$ .............................. G06K 9/00
(52) U.S. Cl. .................... 382/128; 128/922
(58) Field of Search .............. 382/128, 131, 382/132, 164, 171, 173, 180, 199, 205; 128/922

(56) References Cited

U.S. PATENT DOCUMENTS

| 4,710,876 A | | 12/1987 | Cline et al. ............... 364/414 |
| 4,751,643 A | | 6/1988 | Lorensen et al. .......... 364/414 |
| 4,905,148 A | | 2/1990 | Crawford ................. 364/413.1 |
| 5,133,020 A | * | 7/1992 | Giger et al. .............. 382/128 |
| 5,352,613 A | * | 10/1994 | Tafas et al. .............. 436/63 |
| 5,457,754 A | * | 10/1995 | Han et al. ................ 382/128 |
| 5,553,207 A | * | 9/1996 | Sekiguchi et al. ......... 345/424 |
| 6,246,784 B1 | * | 6/2001 | Summers et al. .......... 382/128 |

FOREIGN PATENT DOCUMENTS

WO       WO065985        5/2000

OTHER PUBLICATIONS

Edward A. Ashton, KJ Parker, MJ Berg, CW Chen, "A Novel Volumetric Feature Extraction Technique, With Applications To MR Images", 0-8186-7310-9/95, IEEE, pp. 564-567, 1995.*

Strum, website: http://www.uni-koblenz.de/~lb/lb_research/research.csc3d.html; archived on Aug. 3, 2001 by the Wayback Machine at www.archive.org.*

Edward A. Ashton, MJ Berg, KJ Parker, J Weisberg, C W Chen, L. Ketonen, "Segmentation and Feature Extraction Techniques, with Applications To MRI Head Studies", MRM 33:670-677 (1995).

Edward A. Ashton, MJ Berg, KJ Parker, J Weisberg, CW Cehn and L Ketonen, "Segmentation and Features Extraction Techniques, With Applications To Biomedical Images", 0-8186-6960-0/94, IEEE, pp. 726-730 (1994).

Michael W. Vannier and JW Haller, "Biomedical Image Segmentation", 0-8186-8821- IEEE, pp. 20-24, 1998.

Edward A. Ashton, KJ Parker, MJ Berg, CW Chen, "A Novel Volumetric Feature Extraction Technique, With Applications To MR Images", 0-8186-7310-9/95, IEEE, pp. 564-567, 1995.

* cited by examiner

Primary Examiner—Brian Werner
Assistant Examiner—Christopher Lavin
(74) Attorney, Agent, or Firm—Jean K. Testa; Christian G. Cabou

(57) ABSTRACT

A method and system for segmenting three-dimensional (3D) medical images containing an object of interest are provided. The method comprises generating a plurality of successive layers of fixed radius spheres about a circumference of a sphere containing at least one seed point placed within the object of interest when a plurality of respective voxels contained within the spheres exceed a selected threshold. The generation of the layers is repeated until no further voxels contained within an outer surface of each respective layer exceed the selected threshold or a stop seed point is encountered. The layers form a segmented representation of the object of interest.

11 Claims, 3 Drawing Sheets

METHOD AND SYSTEM FOR SEGMENTATION OF MEDICAL IMAGES

BACKGROUND OF INVENTION

This invention relates to segmentation of medical images. More particularly, the invention relates to a method and system for segmenting an object of interest in three-dimensional medical images for use in volumetric measurement.

It is well-known to obtain three-dimensional (3D) arrays of data representing one or more physical properties within an interior of a solid body, for example, anatomical structures. In medical imaging, such data is obtained by a variety of non-invasive methods such as computed tomography (CT), magnetic resonance imaging (MRI), ultrasound, positron emission tomography (PET), x-ray or a combination thereof. Regardless of the image data acquisition method, the 3D array of data typically consists of a plurality of sets of three-dimensional coordinates distributed at regular positions about the body of interest. There are a variety of techniques available to generate a three-dimensional model or structure. Typically, a seed voxel (volume element) is placed within the anatomical structure of interest and adjacent voxels are successively analyzed and identified as belonging to the same structure generally if they are adjacent to a previously identified voxel and they meet a specified attribute, such as intensity or radiological density. In accordance with any of the known techniques, a 3D image is obtained for visualization.

The three-dimensional (3D) visualization of internal anatomical structures is a known and particularly useful technique for medical professionals and research scientists. Three-dimensional models enable the ability to rotate the model or virtual representation of the anatomical structure, as well as adjust a point of perspective and zoom in/out from features of interest. Additionally, volumetric measurements are enabled by a variety of known 3D image processing techniques.

Three-dimensional visualization and volume measurement is of particular interest for studying degenerative brain diseases such as Alzheimer's disease (AD). There are 4 million people in the United States diagnosed with dementia in Alzheimer's disease. Examination of the Alzheimer brain pathology shows extensive β-amyloid plaque, neuron tangles and brain atrophy. Typically, magnetic resonance imaging brain volume measurements are used to monitor the disease progression. Normal aging brain atrophy is only about a 3.5% decrease per decade, but the rate of atrophy increases in subjects exhibiting dementia. Thus, brain volume measurements provide a measurable correlation available to predict Alzheimer's disease.

Measurements of brain volume from 3D magnetic resonance images either by registration methods or by segmentation methods are typically tedious because manual editing is required to remove the scalp from the intracranial volume in a 3D representation. Supervised segmentation methods are not sufficiently accurate because of inter observer error. Another technique, known as active contours, has been able to segment the brain using a model where the surface of the active contour (bubble) moves at a velocity that depends on curvature and diffusive flow. This involves growing a bubble constrained by image parameters such as gradients and curvature and constructing a force that stops the bubble growth. However, most of the available techniques encounter some degree of error. For example, the connected volume after segmentation may include regions that are not of interest thus requiring some user intervention. Further, the connected volume may include connection through a undesired narrow region, bridge or other small structure that connects different regions that are desirably separated.

What is needed is a method and system for segmenting three-dimensional medical images in an automatic manner with minimal user intervention.

SUMMARY OF INVENTION

In a first aspect, a method for segmenting three-dimensional (3D) medical images containing an object of interest is provided. The method comprises generating a plurality of successive layers of fixed radius spheres about a circumference of a sphere containing at least one seed point placed within the object of interest when a plurality of respective voxels contained within the spheres exceed a selected threshold. The generation of the layers is repeated until no further voxels contained within an outer surface of each respective layer exceed the selected threshold. The layers form a segmented representation of the object of interest.

In a second aspect, an alternative method for segmenting three-dimensional (3D) medical images containing an object of interest is provided. The method comprises placing at least one start seed point within the object of interest and placing at least one stop seed point outside the object of interest. Successive layers of spheres are generated about a circumference of a sphere containing at the least one start seed point when a plurality of respective voxels contained within the spheres exceed an selected initial threshold. The generation of the layers is repeated until no further voxels contained within an outer surface of each respective layer exceed the selected initial threshold or until the at least one stop seed is encountered to form a segmented representation of the object of interest. The selected threshold is adjusted in response to encountering the stop seed point.

In a third aspect, a system for segmenting medical images acquired by an image acquisition device is provided. The system comprises a processor coupled to the image acquisition device and adapted to perform segmentation computations in accordance with the methods above and an interface unit coupled to the processor adapted to present information relating to the segmented representation.

BRIEF DESCRIPTION OF DRAWINGS

The features and advantages of the present invention will become apparent from the following detailed description of the invention when read with the accompanying drawings in which.

DETAILED DESCRIPTION

Figure 1:
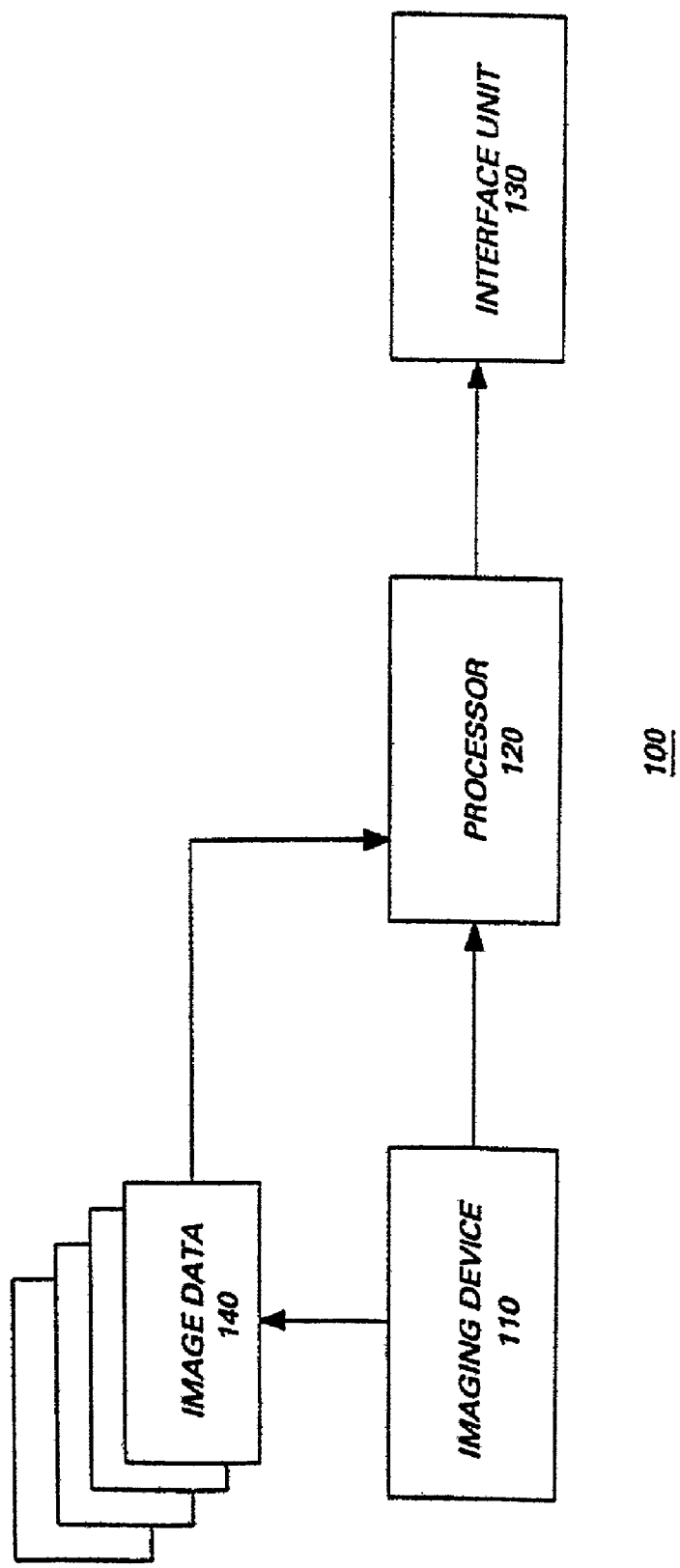
FIG. 1 is a block diagram illustration of a medical imaging system for which embodiments of the present invention are applicable.

Referring to FIG. 1, a general block diagram of a system 100 for disease detection is shown. System 100 includes an imaging device 110, which can be selected from a number of medical imaging devices known in the art for generating a plurality of images. Most commonly, computed tomography (CT) and magnetic resonance imaging (MRI) systems are used to generate a plurality of medical images.

During a CT imaging session, a patient lies horizontal and is exposed to a plurality of x-rays measured with a series of X-ray detectors. A beam of x-rays passes through a particular thin cross-section or "slice" of the patient. The detectors measure the amount of transmitted radiation. This information is used to compute the x-ray attention coefficient for sample points in the body. A gray scale image is then constructed based upon the calculated x-ray attenuation coefficients. The shades of gray in the image contrast the amount of x-ray absorption of every point within the slice. The slices obtained during a CT session can be reconstructed to provide an anatomically correct representation of the area of interest within the body that has been exposed to the x-rays.

During a MR imaging session, the patient is placed inside a strong magnetic field generated by a large magnet. Magnetized protons within the patient, such as hydrogen atoms, align with the magnetic field produced by the magnet. A particular slice of the patient is exposed to radio waves that create an oscillating magnetic field perpendicular to the main magnetic field. The slices can be taken in any plane chosen by the physician or technician (hereinafter the "operator") performing the imaging session. The protons in the patient's body first absorb the radio waves and then emit the waves by moving out of alignment with the field. As the protons return to their original state (before excitation), diagnostic images based upon the waves emitted by the patient's body are created. Like CT image slices, MR image slices can be reconstructed to provide an overall picture of the body area of interest. Parts of the body that produce a high signal are displayed as white in an MR image, while those with the lowest signals are displayed as black. Other body parts that have varying signal intensities between high and low are displayed as some shade of gray.

Once initial MR or CT images have been obtained, the images are generally segmented. The segmentation process classifies the pixels or voxels of an image into a certain number of classes that are homogeneous with respect to some characteristic (i.e. intensity, texture, etc.). For example, in a segmented image of the brain, the material of the brain can be categorized into three classes: gray matter, white matter, and cerebrospinal fluid. Individual colors can be used to mark regions of each class after the segmentation has been completed. Once the segmented image is developed, surgeons can use the segmented images to plan surgical techniques.

Generally, creating a segmented CT or MR image involves several steps. A data set is created by capturing CT or MR slices of data. Through the segmentation process, a gray scale value is then assigned to each point in the data set and different types of tissues will have different gray scale values. Each type of material in the data is assigned a specific value and, therefore, each occurrence of that material has the same gray scale value. For example, all occurrences of bone in a particular image may appear in a particular shade of light gray. This standard of coloring allows the individual viewing the image to easily understand the objects being represented in the images.

FIG. 1 illustrates a medical imaging system 100 to which embodiments of the invention are applicable. The system includes an imaging device 110, a processor 120 and an interface unit 130. Imaging device 110 is adapted to generate a plurality of image data sets 140 and is, for example, a computed tomography (CT) or magnetic resonance (MR) scanner. In the context of CT or MR, acquisition of image data is generally referred to as "scans". Processor 120 is configured to perform computations in accordance with embodiments of the present invention which will be described in greater detail with reference to FIGS. 2–6. Processor 120 is also configured to perform computation and control functions for well-known image processing techniques such as reconstruction, image data memory storage, segmentation and the like. Processor 120 may comprise a central processing unit (CPU) such as a single integrated circuit, such as a microprocessor, or may comprise any suitable number of integrated circuit devices and/or circuit boards working in cooperation to accomplish the functions of a central processing unit. Processor 120 desirably includes memory. Memory within processor 120 may comprise any type of memory known to those skilled in the art. This includes Dynamic Random Access Memory (DRAM), Static RAM (SRAM), flash memory, cache memory, etc. While not explicitly shown in FIG. 1, the memory may be a single type of memory component or may be composed of many different types of memory components. Processor 120 is also capable of executing the programs contained in memory and acting in response to those programs or other activities that may occur in the course of image acquisition and image viewing. As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Interface unit 130 is coupled to processor 120 and is adapted to allow human users to communicate with system 100. Processor 120 is further adapted to perform computations that are transmitted to interface unit 130 in a coherent manner such that a human user is capable of interpreting the transmitted information. Transmitted information may include images in 2D or 3D, color and gray scale images, and text messages regarding diagnosis and detection information. Interface unit 130 may be a personal computer, an image work station, a hand held image display unit or any convention image display platform generally grouped as part of a CT or MRI system. Referring further to FIG. 1, processor 120 is adapted to perform the segmentation methods which will be described in greater detail with reference to FIGS. 2–6 and in response to placement of seed points from, for example, interface unit 130.

All data gathered from multiple scans of the patient is to be considered one data set. Each data set can be broken up into smaller units, either pixels or voxels. When the data set is two-dimensional, the image is made up of units called pixels. A pixel is a point in two-dimensional space that can be referenced using two dimensional coordinates, usually x and y. Each pixel in an image is surrounded by eight other pixels, the nine pixels forming a three-by-three square. These eight other pixels, which surround the center pixel, are considered the eight-connected neighbors of the center pixel. When the data set is three-dimensional, the image is displayed in units called voxels. A voxel is a point in three-dimensional space that can be referenced using three-dimensional coordinates, usually x, y and z. Each voxel is surrounded by twenty-six other voxels. These twenty-six voxels can be considered the twenty-six connected neighbors of the original voxel.

In a first embodiment, a method for segmenting three-dimensional (3D) medical images containing an object of interest is provided. The method comprises generating a plurality of successive layers of fixed radius spheres about a circumference of a sphere containing at least one seed point placed within the object of interest when a plurality of respective voxels contained within the spheres exceed a selected threshold. The method further comprises repeating generation of the layers until no further voxels contained within an outer surface of each respective layer exceed the selected threshold, the layers forming a segmented representation of the object of interest. The radius is selected in accordance with a desired radius of curvature of the segmented representation. Further in this embodiment, the layers of spheres within the segmented representation of the object is wholly contained within the object of interest.

In a further embodiment, a method for segmenting three-dimensional medical images containing an object of interest comprises placing at least one seed point in the object of interest and generating at least one spherical wavelet having a selected radius about the seed point. A plurality of voxels contained with the wavelet are each compared with a selected threshold. Additional spherical wavelets are generated circumferentially about the wavelet when the plurality of voxels exceed the selected threshold. The plurality of spherical wavelets having an advancing surface about an outside circumference. The comparing and generating steps are repeated for each of the plurality of voxels contained within the additional spherical wavelets on the advancing surface to generate layers of spherical wavelets to form a segmented representation (alternatively referred to as connected volume) of the object of interest. The repeating step is ended when no further voxels contained within the advancing surface exceed the selected threshold.

In an exemplary embodiment, the images are three-dimensional brain images acquired by Magnetic Resonance Imaging (MRI). However, it is to be appreciated by one skilled in the art that the three-dimensional images may be acquired techniques other than magnetic resonance imaging (MRI), for example computed tomography (CT), positron emission tomography (PET), and x-ray systems and for other objects of interest, for example veins and arteries. Generally, three-dimensional magnetic brain images have been segmented by connectivity; however, there are usually connections between the intracranial volume and the scalp. One path that connects the brain to the scalp is along the optic nerve to the fluid filled eye globes and then the facial tissue. One or more seeds in placed in the object (in this case is the brain) and wavelets of a fixed spherical radius are formed. As used herein a "wavelet" refers to a data structure representing the voxels contained within a sphere. The radius of the wavelet is selected by the user to prevent connectivity along narrow paths. The wavelets are tested and only those spherical regions completely composed of voxels above a critical threshold are allowed to propagate. The threshold refers to a parameter defining an object of interest and is generally based on intensity values. The threshold is selected to define the object such that the voxels within the object of interest are above the threshold and the remaining voxels are background. The threshold alone is generally not sufficient for segmentation because other objects may also have an intensity value above the threshold. For example, the brain and scalp have similarly high relative intensity compared to other voxels. The selected radius and prevention of connectivity along narrow paths will be discussed in greater detail below. The voxels adjacent to the selected seed voxels are candidates for the creation of active seeds. At the boundary of the growing bubble there are active spherical wavelets with active seeds at the center. The bubble is composed of the region swept out by the wavelets. After each iteration, a layer of wavelets propagate in until there are no more active seeds. The union of all the spherical regions (wavelets) that are completely above the threshold define the connected volume (bubble). It is to be noted that regions that form bridges smaller in dimension than the selected bubble diameter are not included in the connected region. Further, the connected volume does not propagate into noisy regions where the voxels above threshold are randomly selected. An illustration of the processing of the above method is shown schematically in FIGS. 2–5. An object containing two regions connected by a small bridge. In practice the bridge may be a small structure that connects different regions that are desired to be separatedReferring to FIG. 6, there is shown a flow diagram of an embodiment for segmenting a desired region with a given threshold. At step 210, the user places one or more seeds in the desired region. At step 220, spherical wavelets are constructed at each seed and tested against the interior voxels and if they are all above a threshold this region is marked and the center of the wavelet becomes an active seed. At step 230, the voxels adjacent to all the active seeds are then used to construct spherical wavelets, which are tested against the threshold, and those passing the test are marked and become active seeds. The bubble consists of the union of the wavelets passing the threshold test. Thereafter, at step 240, the surface of the bubble is an active contour, which grows by layers as the process in continued. The process stops when there are no more active seeds found.

Figure 2:
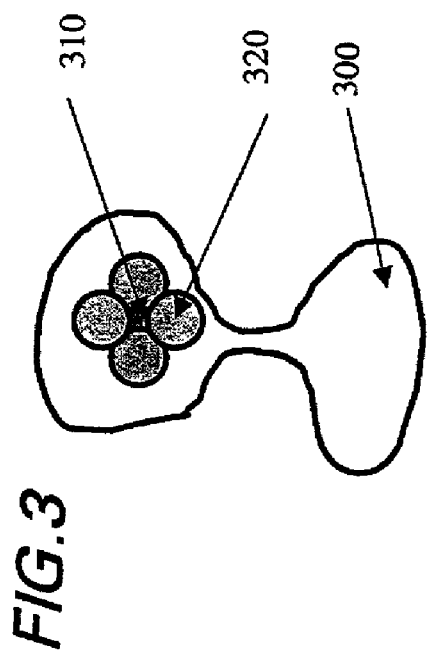
FIGS. 2–5 are illustrations of the processing using embodiments of the present invention.
Figure 3:
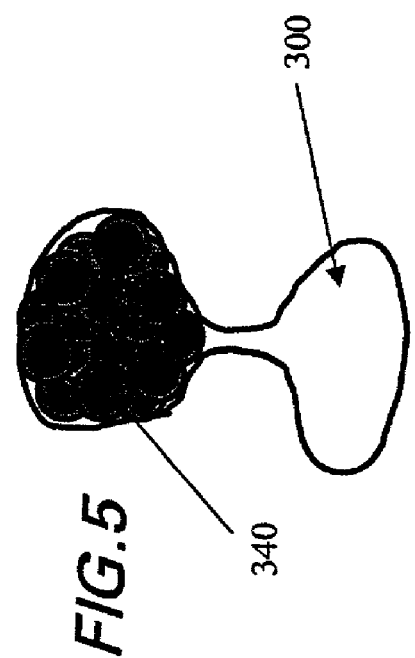
Figure 4:
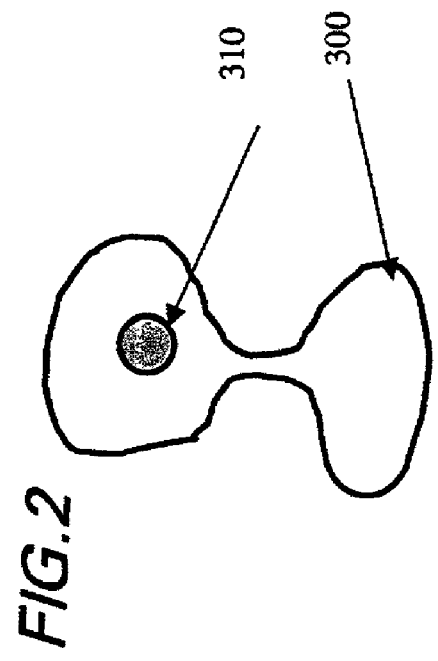
Figure 5:
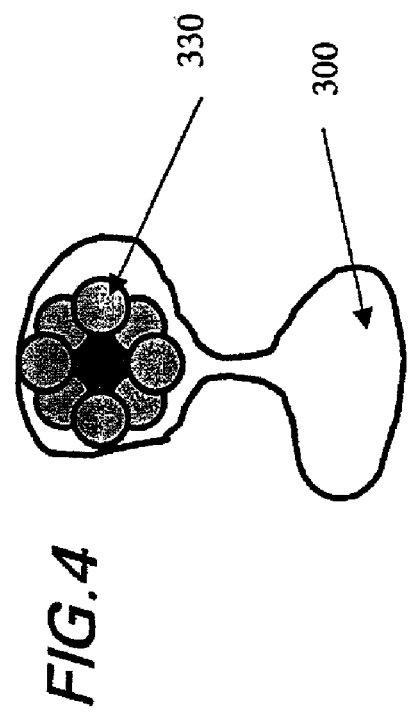
Figure 6:
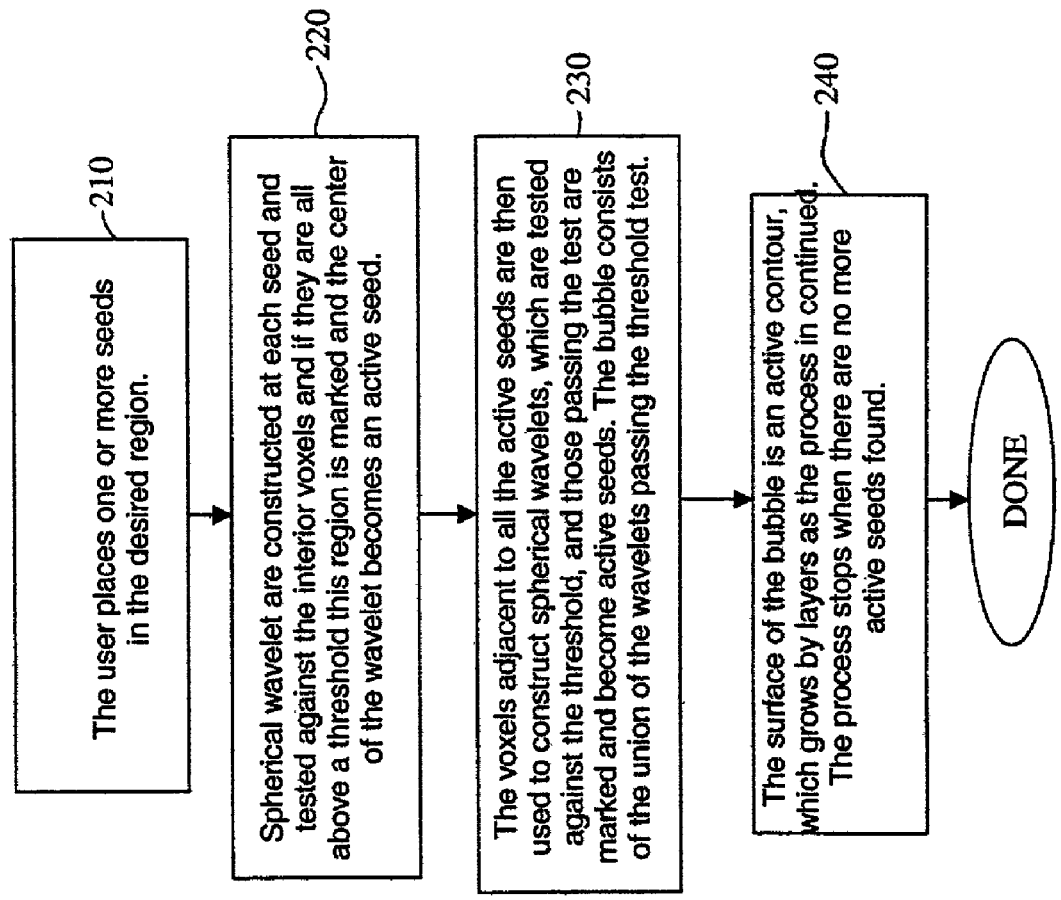
FIG. 6 is a flow diagram illustration of a process flow of a segmentation method to which embodiments of the present invention are applicable.

Referring further to FIGS. 2–5, an illustration of the processing of the above embodiments is shown, particularly in preventing connectivity through a narrow bridge. In FIG. 2, a seed 310 is placed in the object and the spherical region is found to be completely inside the object 300. In FIG. 3, adjacent seeds are placed and the corresponding spheres 320 are found to lie completely inside object 300. FIG. 4 illustrates a successive layer of spheres 330. The connected volume 340 of growing layers fills the available space but does not propegate down the narrow bridge.

The embodiments described above are well-adapted if the threshold can be selected to segment the region of interest without connecting to the region across a bridge. However, it may be necessary manually hunt for the correct threshold which may prove tedius and problematic.

In a further embodiment, an automatic threshold was found by selecting stop seeds in the region away from the region of interest. A binary search was implemented to speed up the process of finding the critical threshold that is just above the threshold that connects the object. The binary search method involves having a threshold range between the minimum and maximum intensity. As the first guess, the average intensity is selected.

In this further embodiment, an alternative method for segementing 3D images is provided. The method comprises placing at least one start seed point within the object of interest and placing at least one stop seed point outside the object of interest. Thereafter, successive layers of spheres are generated about a circumference of a sphere containing at the least one start seed point when a plurality of respective voxels contained within the spheres exceed an initial selected threshold as described above. The generation of the layers is repeated until no further voxels contained within an outer surface of each respective layer exceed the selected threshold or until the at least one stop seed is encountered to form a segmented representation, or alternatively connected volume, of the object of interest and to prevent connecting to undesired areas. The steps of generating a sphere about a seed point and generating successive layers of spheres is performed similarly to the embodiments described above. If the bubble wave connects to the stop seeds, the threshold in increased by half of the first guess otherwise it is decreased by half of the first guess. The process is repeated until the step size is equal to the increment of intensity resolution. The critical threshold is one greater than the maximum value that connects the seeds to the stop seeds. The radius of the spheres is selected in accordance with a desired radius of curvature of the segmented representation.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed:

1. A method for segmenting three-dimensional (3D) medical images containing an object of interest comprising:
   generating a plurality of successive layers of fixed radius spheres about a circumference of a sphere containing at least one seed point placed within the object of interest when a plurality of respective voxels contained within the spheres exceed a selected threshold; and,
   repeating generation of the layers until no further voxels contained within an outer surface of each respective layer exceed the selected threshold, the layers forming a segmented representation of the object of interest.

2. The method of claim 1 wherein the radius is selected in accordance with a desired radius of curvature of the segmented representation.

3. The method of claim 1 wherein the layers of spheres within the segmented representation of the object is wholly contained within the object of interest.

4. The method of claim 1 wherein the three-dimensional images are acquired by at least one of magnetic resonance imaging (MRI), computed tomography (CT), position emission tomography (PET), and x-ray systems.

5. A method for segmenting three-dimensional medical images containing an object of interest comprising:
   placing at least one seed point in the object of interest;
   generating at least one spherical wavelet having a selected radius about the seed point;
   comparing a plurality of voxels contained with the wavelet with a selected threshold;
   generating a plurality of additional spherical wavelets circumferentially about the wavelet when the plurality of voxels exceed the selected threshold; the plurality of spherical wavelets having an advancing surface about an outside circumference;
   repeating the comparing and generating steps for each of the plurality of voxels contained within the additional spherical wavelets on the advancing surface to generate layers of spherical wavelets to form a segmented representation of the object of interest, the repeating step ending when no further voxels contained within the advancing surface exceed the selected threshold.

6. The method of claim 5 wherein the radius is selected in accordance with a desired radius of curvature of the segmented representation.

7. The method of claim 5 wherein the three-dimensional images are acquired by at least one of magnetic resonance imaging (MRI), computed tomography (CT), position emission tomography (PET), and x-ray systems.

8. A method for segmenting three-dimensional (3D) medical images containing an object of interest comprising:
   placing at least one start seed point within the object of interest;
   placing at least one stop seed point outside the object of interest;
   generating successive layers of spheres about a circumference of a sphere containing at the least one start seed point when a plurality of respective voxels contained within the spheres exceed an selected initial threshold;
   repeating generation of the layers until no further voxels contained within an outer surface of each respective layer exceed the selected initial threshold or until the at least one stop seed is encountered to form a segmented representation of the object of interest; and,
   adjusting the selected threshold in response to encountering the stop seed point.

9. The method of claim 8 wherein the spheres have a selected radius based on desired radius of curvature.

10. The method of claim 8 wherein the three-dimensional images are acquired by at least one of magnetic resonance imaging (MRI), computed tomography (CT), position emission tomography (PET), and x-ray systems.

11. The method of claim 8 wherein the adjusting step is performed with a binary search and the selected initial threshold is an average of a minimum and maximum intensity of the object.

* * * * *